(12) United States Patent
Kutty et al.

(10) Patent No.: US 7,042,803 B2
(45) Date of Patent: May 9, 2006

(54) MARINE SEISMIC SOURCE TOWING APPARATUS AND METHOD

(75) Inventors: Shyam Kutty, Stafford, TX (US); David McCall, Alvin, TX (US)

(73) Assignee: Input/Output Inc., Stafford, TX (US)

( * ) Notice: Subject to any disclaimer, the term of this patent is extended or adjusted under 35 U.S.C. 154(b) by 422 days.

(21) Appl. No.: 10/071,105

(22) Filed: Feb. 8, 2002

(65) Prior Publication Data

US 2003/0151974 A1   Aug. 14, 2003

(51) Int. Cl.
*G10K 11/00* (2006.01)
*G01V 1/38* (2006.01)

(52) U.S. Cl. .................. 367/153; 367/15; 367/141; 367/144; 367/154; 181/110; 181/118

(58) Field of Classification Search .......... 367/15, 367/16, 144, 153, 154, 141; 181/110, 118
See application file for complete search history.

(56) References Cited

U.S. PATENT DOCUMENTS

| | | | | | |
|---|---|---|---|---|---|
| 4,718,045 | A | * | 1/1988 | Desler ........................ | 367/24 |
| 4,970,046 | A | * | 11/1990 | Dolengowski ............. | 367/153 |
| 5,281,773 | A | * | 1/1994 | Duren ........................ | 181/111 |
| 5,841,733 | A | * | 11/1998 | Bouyoucos et al. ......... | 367/15 |
| 6,018,494 | A | * | 1/2000 | Laws .......................... | 367/23 |
| 6,044,038 | A | * | 3/2000 | Allensworth ................ | 367/16 |
| 6,185,156 | B1 | * | 2/2001 | Bouyoucos ................ | 367/144 |
| 6,563,762 | B1 | * | 5/2003 | Williams .................... | 367/106 |
| 6,639,873 | B1 | * | 10/2003 | Sanchez .................... | 367/144 |
| 2004/0013041 | A1 | * | 1/2004 | Bouyoucos et al. ........ | 367/144 |

FOREIGN PATENT DOCUMENTS

WO   WO 97/06452   *   2/1997

OTHER PUBLICATIONS

Nooteboom, J.J. "Signature and Amplitude of Linear Airgun Arrays," 1978. Geophysical Prospcting 26, 194-201.*
Geophysical Prospecting, vol. 26, Part 1, Mar. 1978, J. J. Noooteboom, *Signature and Amplitude of Linear Airgun Arrays*, pp. 194-201.
Geophysics, vol. 56, No. 3, Mar. 1991, P.M. Fontana and T.A. Haugland, *Compact Sleeve-Gun Source Arrays*, pp. 402-407, 12 figures.

* cited by examiner

*Primary Examiner*—Jack Keith
*Assistant Examiner*—Scott A. Hughes
(74) *Attorney, Agent, or Firm*—Madan,Mossman & Sriram, P.C.

(57) ABSTRACT

A marine acoustic source system has relativley densely packed energy sources arrayed in a tandem-like fashion along a horizontal plane. Preferably, a longitudinal axis of each source lies orthogonal to a pre-determined towing direction. The system includes protective tubes that encloses supply lines and auxiliary equipment, and a harness. The harness provides the primary mechanical connection for towing the sources through the water. To minimize bending of the supply lines, connectors having angular portions connect the sources to the supply lines. Further, the sources can be arranged such that source connection interfaces for receiving power, hydraulic fluid, or data point alternately in opposing directions. During use, the sources, e.g., air guns, are supported at a predetermined depth beneath the water's surface by a floatation buoy. Upon activation, the sources of a cluster each release individual air bubbles into the water. Because the air guns are relatively densely packed, the individual air bubbles coalesce into a single bubble that produces the desired acoustical signal.

10 Claims, 7 Drawing Sheets

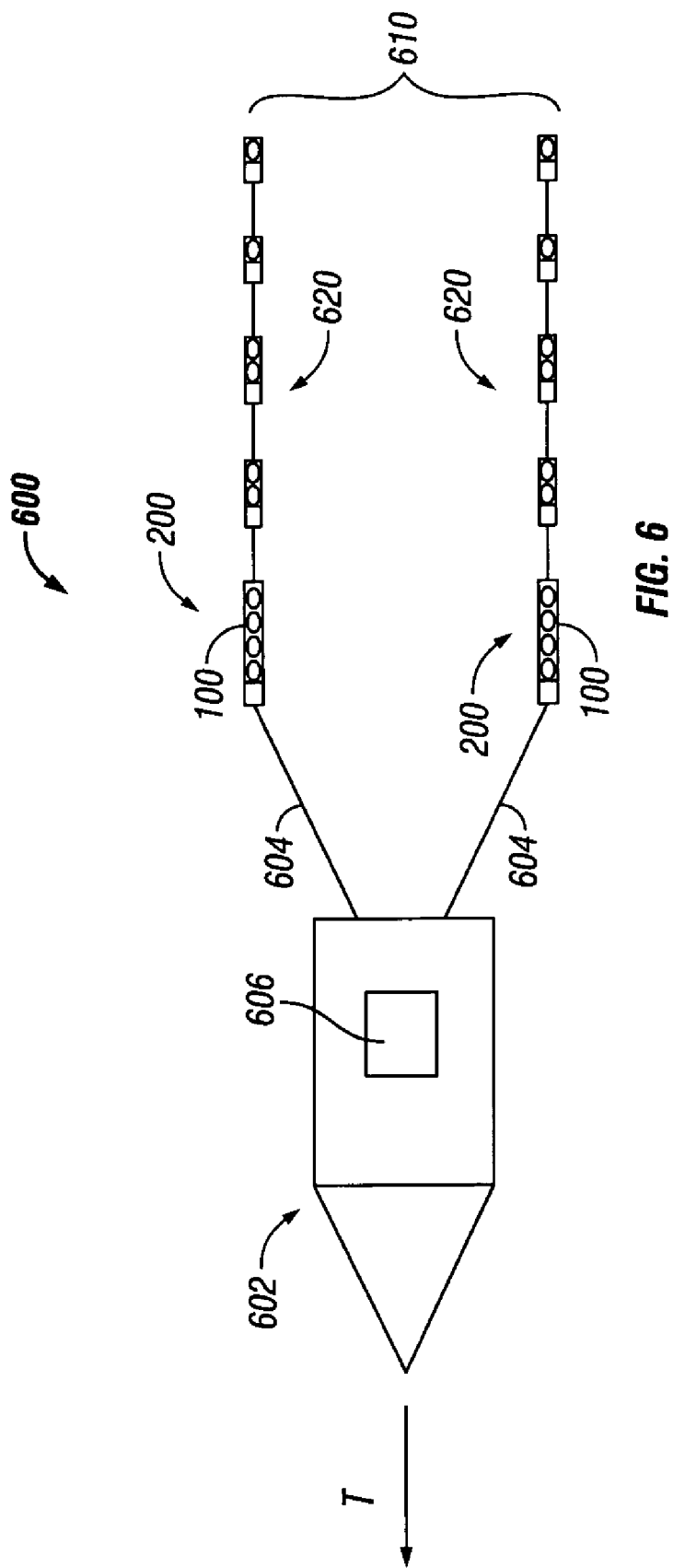

MARINE SEISMIC SOURCE TOWING APPARATUS AND METHOD

BACKGROUND OF THE INVENTION

1. Field of the Invention

This invention relates generally geologic surveys and more particularly to an apparatus and method for producing acoustic signals in a marine environment.

2. Description of the Related Art

Seismic exploration is used to determine the presence of subsurface structures in earth formations that may contain useful materials such as hydrocarbons. During marine seismic operations, a service vessel often tows an acoustic source such as an array of air guns to generate high-powered acoustic signals. The acoustic energy transmitted by the acoustic source radiates generally downwardly into the sea floor and is partially reflected back towards the earth's surface by subsurface acoustic impedance boundaries, called reflectors, which may exist within the earth. The transducers (e.g, hydrophones), which are positioned at or near the water's surface, are used to detect this reflected acoustic energy. The transducers generate electrical signals proportional to the magnitude of the acoustic energy detected.

Typically, the acoustic source consists of an air gun array. A conventional air gun array can consist of a plurality of sub-arrays. Each sub-array includes several air guns that are placed in a pre-defined spatial relationship to one another. Auxiliary equipment, such as air gun controllers, is usually positioned immediately above these air guns. Additionally, supply lines such as air hoses, electrical power lines and communications run between the air guns and equipment on the service vessel. During operation, all the air guns of a sub array are activated simultaneously. Upon activation, the air guns release individual gas or air bubbles into the water. These bubbles produce acoustical energy that radiates into the water. The pulse characteristics, such as the frequency, bubble ratio and amplitude, of the overall pressure pulse produced by an air gun subarray is a function of the characteristics of the pressure pulses produced by the individual air guns and the physical arrangement of the air guns in that air gun subarray.

Certain seismic survey activities such as those targeting relatively deep subsurface formations or for reservoir mapping require a relatively powerful acoustic signal to obtain the necessary data. While an air gun can be configured to produce this powerful acoustical signal, the overall dimensions and weight of such an air gun can be substantial. It is generally undesirable to use heavy, bulky equipment in a shipboard environment because of factors such as limited storage capacity, lifting and handling requirements, and difficulties in deployment and retrieval.

Instead of a single air gun, a relatively powerful acoustic signal can be produced by an air gun cluster. That is, two or more relatively small air guns can be "clustered" to produce an acoustical signal similar to a signal produced by a much larger air gun. To achieve this affect, each gun in a cluster should be placed sufficiently close together so that their bubbles coalesce in the early stages of the bubble expansion. Conventional methods of clustering air guns include two or three air guns stacked in vertical alignment, i.e., perpendicular to the water surface. Another method uses a triangular relationship wherein a single air gun is superposed over two side-by-side air guns. It is also reported that air guns have been arranged in horizontal alignment.

These conventional methods of clustering air guns have a number of drawbacks. First, conventional clustering arrangements having air guns at different depths can produce asymmetric loadings. For example, the net reaction between two air guns can produce a damaging upward force on an air gun above the two air guns. Moreover, the vertically clustered air guns may need additional equipment to maintain their orientation during towing. More generally, the gun controllers and other auxiliary equipment used in conjunction with conventional air gun arrays can be exposed to the pressure pulse generated by the air gun array during use. Repeated exposure to the jarring affect of the air gun operation can shorten service life or lead to catastrophic failure of this equipment. Further, the supply lines associated with the air guns are frequently exposed to the wave action and contact with the water. This contact can cause, for example, failure in the joints making up the supply lines. In a different aspect, some conventional air gun arrays have profiles that induce substantial drag during towing.

The present invention addresses these and other drawbacks of conventional marine acoustic source systems.

SUMMARY OF THE INVENTION

The present invention provides a marine acoustic source system having a dense source cluster. The sources, typically air guns, are arrayed in a tandem-like fashion along a horizontal plane beneath the water's surface during towing in a pre-determined direction. Air guns are usually cylindrical in shape and have a connection interface for receiving power, air, or data transmission lines. Each air gun is aligned such that the longitudinal axis of the air gun is orthogonal to the towing direction. The components associated with the air gun cluster include supply lines and auxiliary equipment (e.g., gun controller).

The acoustic source system uses protective tubes and a harness to support and protect the air guns, supply lines and auxiliary equipment. The protective tube has an elongated axial chamber that substantially houses the span of supply lines between a lead hose and the air guns. The auxiliary equipment is also placed within the chamber. Because this equipment is adjacent and outboard of the air guns, they are protected from the direct blast generated by the air guns. A preferred protective tube includes sleeves, couplings, and connectors. The sleeves are flexible hose-like members that interconnect the couplings. Each coupling has a neck leading to and mating with an air gun. The connectors provide a rugged connection between the air gun and the supply lines. Preferably, the connector has an elbow or angular portion that enables a connection that is substantially co-axial with a supply line.

In a preferred cluster arrangement, the air guns are arranged such that the connection interfaces alternate in opposing directions. For example, the air gun array can have a first set of air guns having connection interfaces oriented in a first direction and a second set of air guns having connection interfaces oriented in a second direction. Separate supply lines connect to the connection interfaces of each set of air guns. Likewise, a separate protective tube is provided for each supply line. The use of two protective tubes enhances stability of the air gun array. Moreover, the increased interior space provided by two protective tubes can accommodate a greater number of supply lines. Thus, more air guns can be added to the air gun cluster.

The harness provides the primary mechanical connection through which the air guns are towed through the water. The harness includes collars that are affixed to each air gun, a mating end that connects to the termination, and linking members that connect each of the air guns to the mating end.

During use, an exemplary acoustic seismic source system is deployed behind a service vessel in shallow water. The air gun array of the system is supported by a floatation buoy at a predetermined depth. A tow line extending from the ship is attached to the termination. During towing, the harness, which is connected to the termination, pulls the air gun arrays, and associated air gun clusters, through the water. The harness, thus, takes up the traction forces induced during towing, thereby minimizing the tension forces that would otherwise be imposed on the supply lines. Upon activation, the air guns of a cluster each release individual air bubbles into the water. Because the air guns are in close proximity to one another, the individual air bubbles coalesce into a single bubble that produces the desired acoustical signal.

Thus, the present invention comprises a combination of features and advantages that enable it to overcome the deficiencies of prior systems and methods. The various characteristics described above, as well as other features, will be readily apparent to those skilled in the art upon reading the following detailed description of the embodiments of the invention, and by referring to the accompanying drawings.

It should be understood that examples of the more important features of the invention have been summarized rather broadly in order that detailed description thereof that follows may be better understood, and in order that the contributions to the art may be appreciated. There are, of course, additional features of the invention that will be described hereinafter and which will form the subject of the claims appended hereto.

DESCRIPTION OF THE FIGURES

For a detailed description of an embodiment of the invention, reference will now be made to the accompanying drawings wherein:

FIG. 6 schematically illustrates an exemplary acoustic source system deployed in a marine environment.

DETAILED DESCRIPTION OF THE INVENTION

Figure 1A:
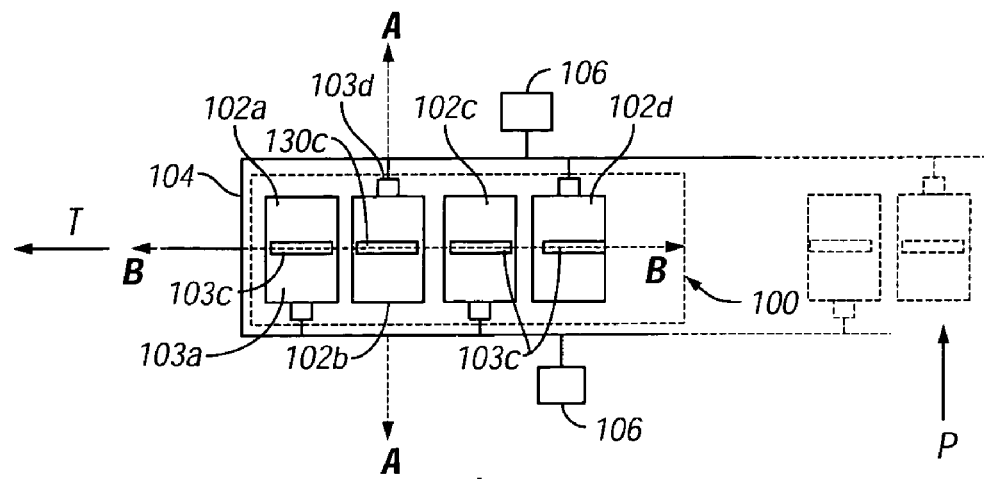
FIG. 1A schematically illustrates a plan view of a preferred air gun cluster made in accordance with the present invention.

The present invention relates to devices and methods providing rugged and cost-effective seismic source system using one or more dense seismic source clusters. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

Referring initially to FIG. 1A there is schematically shown an air gun cluster 100 that includes a plurality of air guns 102a–d. The air guns 102a–d are spatially oriented to produce an acoustical signal substantially similar to a signal produced by a single air gun. The cooperative action of the air guns 102a–d is achieved by placing the air guns 102a–d in sufficiently close physical proximity such that the individual bubbles generated by each air gun 102a–d coalesce into a single air bubble in the early stages of the bubble expansion. An air gun "cluster" should be contrasted with an air gun array or sub-array. In an air gun array or sub-array, the individual bubbles generated by each air gun do not generally coalesce into a single air bubble in the early stages of the bubble expansion. As will become apparent, the teachings of the present invention will enable a greater number of air guns in a cluster as compared with conventional air gun arrangements. While four air guns, which is a particularly preferred arrangement, are depicted in FIG. 1A, it should be understood that greater or fewer air guns may be used. For example, the air guns shown in phantom illustrate an exemplary extension of the cluster 100 or another cluster having two air guns.

The optimal separation distance between air guns 102 in a cluster 100 depends on the volume of the guns, the operating pressure, and the ambient hydrostatic pressure. This optimal separation distance $D_c$, or range of separation, can be calculated with the following Equation A:

Equation A:
$$D_c = 2\left(\frac{3}{4\pi}\frac{P}{P_o}V\right)^{1/3} \pm 50\%$$

In Equation A:
$D_c$=Center-to-center distance between guns in a cluster
P=Gun absolute pressure (psia)
$P_o$=Ambient absolute pressure (psia)
V=Volume of single gun in the cluster For example, a simple cluster may have two air guns each having 150 in$^3$ volume capacity and an absolute pressure of 2000 psig. Further, this cluster may be deployed at a depth of 6 meters. Thus:

V=150 in$^3$
P=2014.7 psia (2000 psig+14.7 psi)
$P_o$=23.4 psia (14.7 psi+(6 m)(1.458 psi/m))

With the above values entered as follows:

$$D_c = 2\left(\frac{3}{4\pi}\frac{2014.7 \text{ psia}}{23.4 \text{ psia}}150 \text{ in}^3\right)^{1/3} \pm 50\%$$

Executing the above calculation shows that the optimal center-to-center distance $D_c$ between air guns is 29.08 inches or 0.74 meters ±0.37 meters. It will be appreciated, therefore, that Equation A provides a range of values for separation distances that will promote the clustering effect; i.e., approximately 0.37 meter to 1.11 meters. Stated more generally, the term "$(D_c-(D_c)(50\%))$" provides an approximate lower limit and the term "$(D_c+(D_c)(50\%))$" provides an approximate upper limit. Thus, Equation A provides a general guideline as to the optimal relative spatial arrangement of the air guns 102.

It should be understood, however, that the clustering effect may still be achieved if the relative spacing of the air guns 102 is outside the optimal range. As a general guideline, for air guns to act independently, that is, to not interact as in a cluster, the separation distance $D_s$ between guns should be greater than the value provided by the following Equation B:

$$D_s \geq 0.62 \cdot V^{1/3} \text{ meters}$$

In Equation B:
 $D_s$=Minimum separation distance in meters
 V=Volume of largest operative air gun in in$^3$ For example, a given array may have two elements: a two 150 in$^3$ air gun cluster and a single 150 in$^3$ gun to be fired at 2000 psig. An "operative air gun" can include a single air gun. Moreover, an "operative air gun" can also include two or more air guns that, during operation, act as a single air gun. In either case, the elements can be considered to have a reference point, such as a center, for establishing relative positioning. In the above example, the volume of the operative air guns, the two-by-150 in$^3$ cluster, is 300 in$^3$, which is greater than the volume of the single air gun. Thus:

$$D_s \geq 0.62(300 \text{ in}^3)^{1/3} m$$

$$D_s \geq 4.2 m$$

Therefore, to prevent the 2×150 in$^3$ air gun cluster from interacting with the single 150 in$^3$ gun, the two elements should be separated by a minimum center-to-center distance of 4.2 meters. Stated differently, to induce a clustering effect, two or more elements should be placed no greater than $D_s$, where $D_s$=0.62·$V^{1/3}$ meters. Equations A and B are general guidelines and employ measurement units (e.g., meters or inches) that generally conform to conventional industrial use. It should be understood that the coefficients and mathematical relationships may vary depending on the particular measurement units used or a given application. For example, the coefficient "0.62" may be as low as 0.50 or as high as 0.75. Furthermore, because Equations A and B are based on empirical relationships, these equations may be subject to refinements based on newly developed technologies. Thus, the present invention is not limited to the precise relationships set forth in Equations A and B. The state of the art as pertaining to mechanics of air gun clustering is illustrated in "Signature and Amplitude of Linear Air Gun Arrays," Nooteboom, J. J., Paper presented at the EAGE Conference, June, 1976, Hague; and in "Compact sleeve-gun source arrays," by P. M. Fontana and T. A. Haugland, Geophysics, Vol. 56, No. 3 (March 1991), both of which are hereby incorporated herein by reference for such teachings.

An exemplary air gun 102$b$ is generally cylindrical and includes a head 103$a$, a tail 103$b$, a port 103$c$, and a connection interface 103$d$. An exemplary connection interface 103$d$ is formed on the head 103$a$ and can include one or more ports, valves, or plugs for receiving power, hydraulic fluid, high-pressure air, or data transmission lines having metal or fiber-optic wires. The connection interface 103$d$ is connected to a supply line 104 via intermediate lines discussed below. The port 103$c$ is an aperture through which high-pressure fluid (e.g., air, gas, or water) selectively exits the air gun 102. For convenience, a longitudinal axis of the air gun 102$b$ is labeled as A—A. The supply line 104 and auxiliary equipment 106 cooperate to energize and operate the air guns 102$a$–$d$. The supply line 104 collectively refers to power lines, air hoses, analog and/or digital data transfer lines, and other similar lines. The auxiliary equipment 106 collectively refers to equipment such as gun controllers, acoustic positioning devices, pressure sensors and depth measurement devices. These are only exemplary of the types of equipment that could be used in conjunction with air guns 102.

It should be understood that the present invention is not limited to air guns but can be advantageously applied to other known acoustic sources such as water guns, gas guns, and marine vibrators. Indeed, the present invention may be directly applicable to any acoustic sources that may be arranged in a cluster fashion to enhance the quality and efficiency of the acoustical energy produced by the acoustic sources.

Figure 1B:
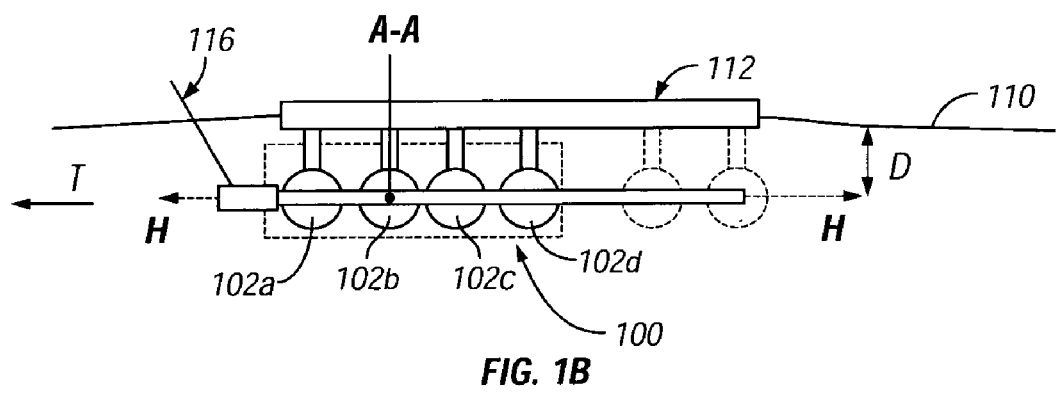
FIG. 1B schematically an elevation view of a preferred acoustic source system deployed in water.
Figure 1C:
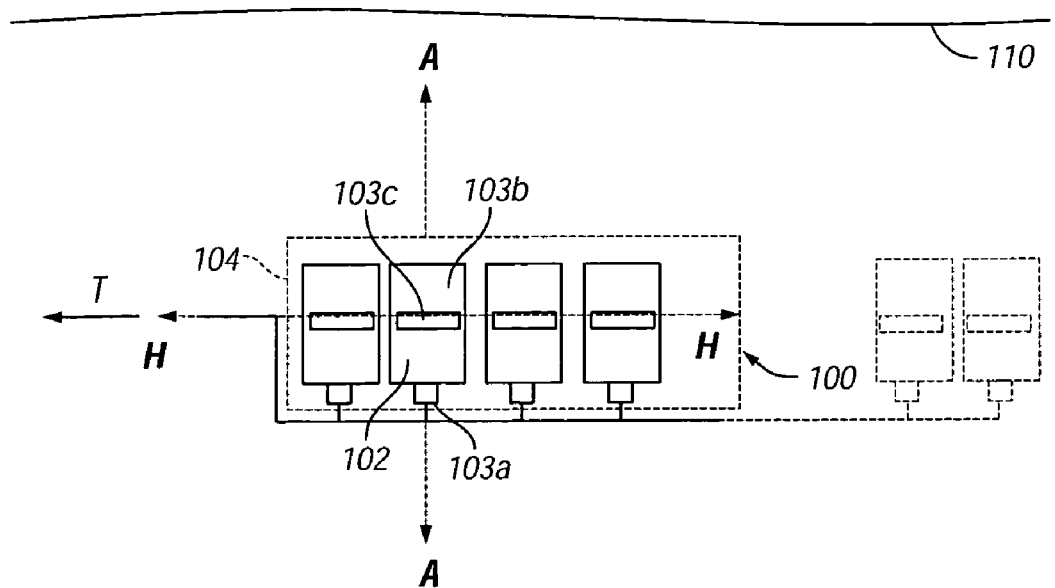
FIG. 1C schematically an elevation view of a preferred air gun cluster wherein the longitudinal axis of the air guns are orthogonal to the direction of towing and the horizontal axis.

Referring now to FIGS. 1A and 1B, the air guns 102$a$–$d$ of the air gun cluster 100 have a preferred spatial relationship relative to the water surface 110, the direction of towing T, and each other. The air guns 102$a$–$d$ are arranged generally along a horizontal plane H—H that is substantially parallel with the water surface 110. By maintaining the air guns 102$a$–$d$ at a substantially common depth, the forces associated with air gun activation will be more symmetric than the forces associated with air guns positioned at different depths. It will be understood that the term "water surface" refers to a nominal condition wherein the water surface is relatively flat and unperturbed by, for example, inclement weather. Accordingly, the "water surface" or "a plane parallel to the water surface" is used synonymously with the term "horizontal plane." Further, the ports 103$c$ of the air guns are aligned along substantially the same plane B—B. Plane B—B is substantially vertical (i.e., perpendicular to the water surface). This alignment of the ports 103$c$ promotes the coalescence of the air bubbles created by the high-pressure fluid (e.g., air) discharged from the ports 103$c$. Where more than one cluster is used, it is also preferred that the ports of the air guns in each such cluster also be aligned in substantially parallel planes; i.e., planes parallel to plane B—B. Of course, the ports of successive air gun clusters need not be in identical planes because of differences in air gun sizes and configurations. In addition to a generally uniform depth, the longitudinal axes A—A of the air guns 102$a$–$d$ are aligned substantially orthogonal to the direction of towing T. In a preferred arrangement, the axes A—A are also parallel with the horizontal axis H—H. From the plan or top view of FIG. 1A, it can be seen that air guns 102$a$–$d$ are thereby placed in a side-by-side or tandem-like configuration. In an alternate embodiment shown FIG. 1C, the longitudinal axes A—A of the air guns 102 are aligned substantially orthogonal to the direction of towing and also substantially orthogonal to the horizontal axis H—H. When this alternate embodiment is used, the air gun tail 103b is directed upwards and the air gun head 103a is directed generally downward. In this alternate embodiment, the plane along which the air gun ports 103c are aligned will be parallel to the water surface. It should be appreciated that these side-by-side configurations enable a more dense packing of the air guns 102a–d as compared, for example, to a configuration wherein the air guns are laid end-to-end. Referring now to FIG. 1B, the air guns 102 are positioned at a pre-defined depth D below the water surface 110. As is known, the air guns 102 must be submerged in order to produce an effective air bubble. Often, depth D is approximately one meter or greater. The depth D, however, can be greater or less depending on the particular application. It would be apparent to one skilled in the art as to the proper depth D at which the air guns 102 should be submerged for a given application.

Figure 2:
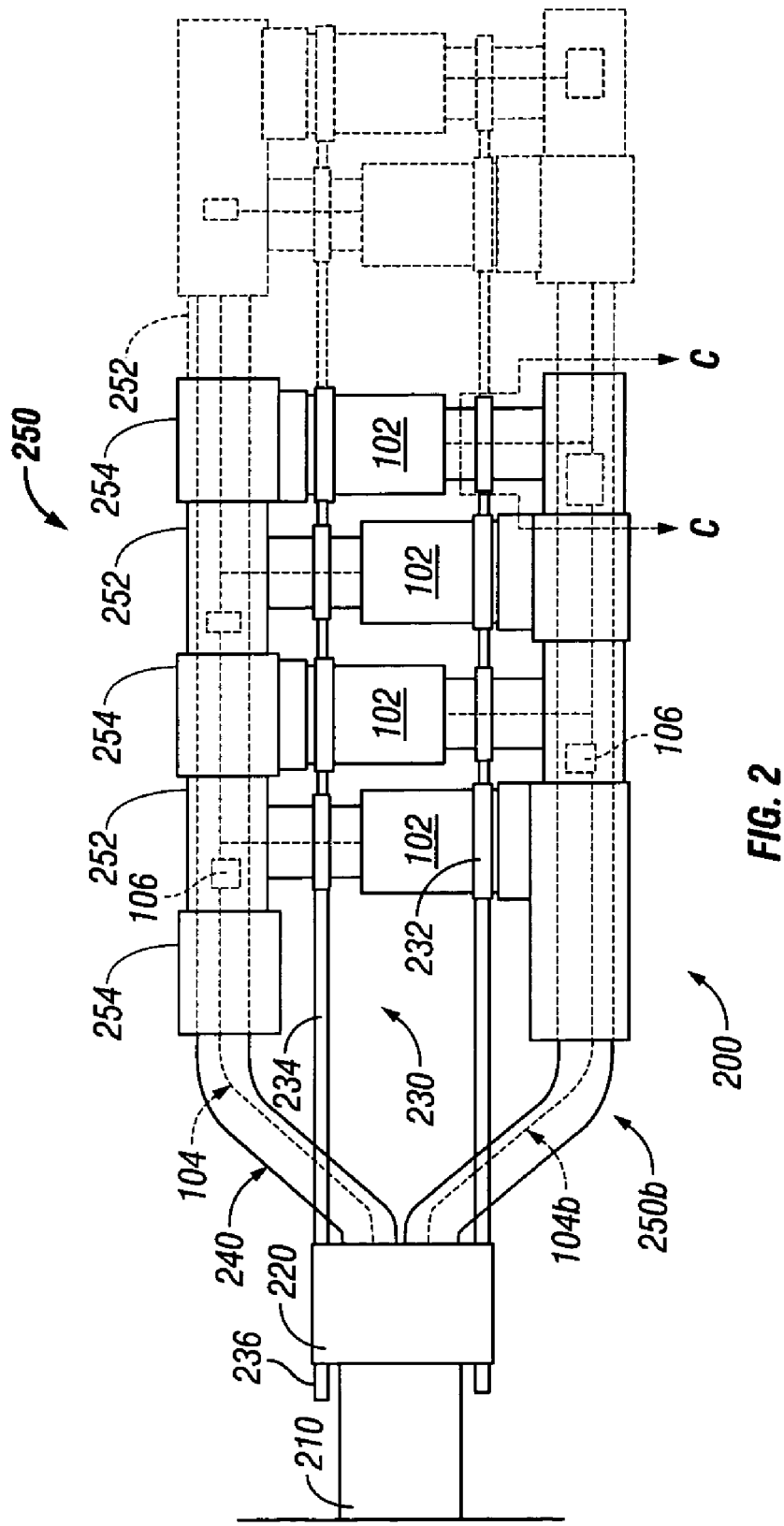
FIG. 2 schematically illustrates a plan view of a preferred seismic acoustic source system made in accordance with the present invention.

Referring now to FIG. 2, there is shown a preferred acoustic source system 200 that incorporates a preferred air gun cluster 100. The air gun cluster 100 includes air guns 102a–d arranged as shown in FIGS. 1A–B. The acoustic source system 200 includes a tow line 210, a termination 220, a harness 230, lead hoses 240, and protective tubes 250a–b. The acoustic source system 200 may be suspended from a floatation device 112 (FIG. 1B). The supply lines 104a–b are positioned inside the hoses 240 and protective tubes 250a–b and thereby protected from the drag forces associated with towing. Likewise, the auxiliary equipment 106 is also located inside the protective tubes 250a–b for protection against the elements and the shock and vibration of air gun operation. Advantageously, the placement of the auxiliary equipment 106 next to the axial ends of the air guns 102a–d, rather than above the airguns, also minimizes the percussive shock encountered by the auxiliary equipment during air gun operation.

The source system 200 preferably minimizes the overall bundle size of the supply lines 104 leading to the air guns 102a–d. For example, a first supply line may be used to connect with a first set of air guns, and a second supply line may be used to connect to a second set of air guns. Thus, two smaller supply line bundles are used in lieu of one large supply line bundle. Referring back to FIG. 1A, in a preferred arrangement, a first set of air guns 102a,c,e have ports 103d pointed in a first direction and a second set of air guns 102b,d,fb have ports 103d pointed in a second direction. Thus, a first supply line 104a connects to the first air gun set 102a,c,e and a second supply line 104b connects to a second air gun set 102b,d,f. The first air gun set 102a,c,e and the second air gun set 102b,d,f are preferably intermeshed such that ports 103d of consecutive air guns 102a–d point alternatively in the first and second directions. It should be understood that the ports 103d need not point in opposing directions and that the ports 103d can point in more than two directions. It will be appreciated that the use of multiple supply lines 104 increases the capacity of the power and data transmission of the acoustic source system and therefore enables the use of additional air guns in the cluster 100.

Figure 3:
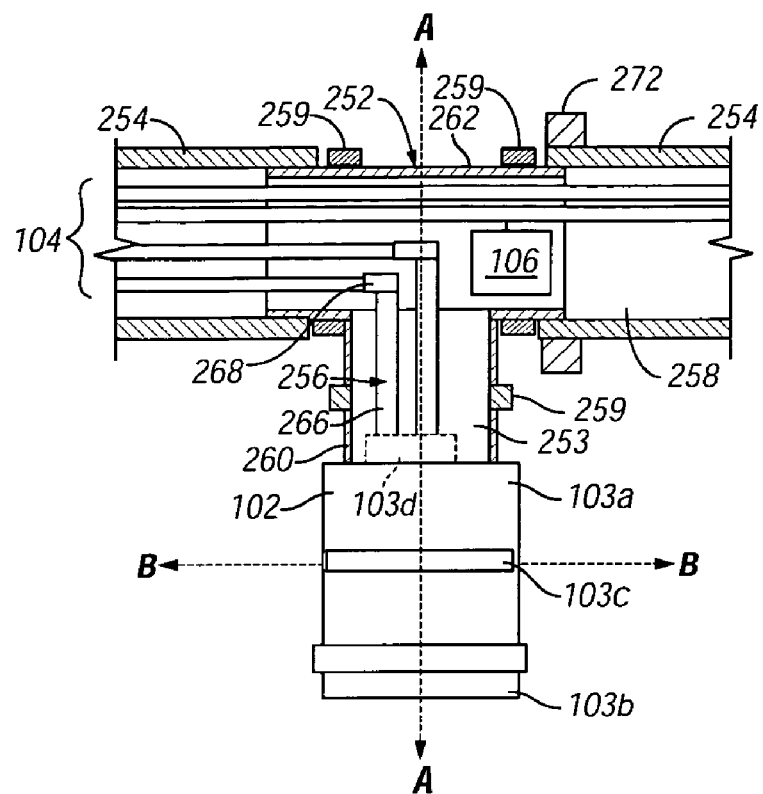
FIG. 3 illustrates a sectional view of a preferred protective tube made in accordance with the present invention.

Referring now to FIG. 2, the acoustic source system 200 uses the tubes 250a–b to protect the supply lines 104 and auxiliary equipment 106 from exposure to the damaging effects of the marine environment. The tubes 250a,b are substantially flooded with water during use and maintain the supply lines 104 and auxiliary equipment 106 in an environment of relatively slow or non-moving water. Thus, the tubes 250a,b reduce the amount of drag imposed on the supply lines 104 and auxiliary equipment 106 as the acoustic system 200 is towed through the water. The tubes 250a–b are positioned outboard of the air guns 102a–d in a generally parallel relationship. Referring now to FIG. 3, each tube 250a–b includes an elongated chamber 258 in which the supply lines 104 and auxiliary equipment 106 may be housed. For example, the supply lines 104 run axially along the chamber 258. The tubes 250a,b may be molded as a single piece or constructed with two or more components. Because tubes 250a and 230b are essentially identical, the following description will, for convenience, refer to tube 250. A preferred tube 250 includes couplings 252, sleeves 254, and connectors 256.

Figure 4:
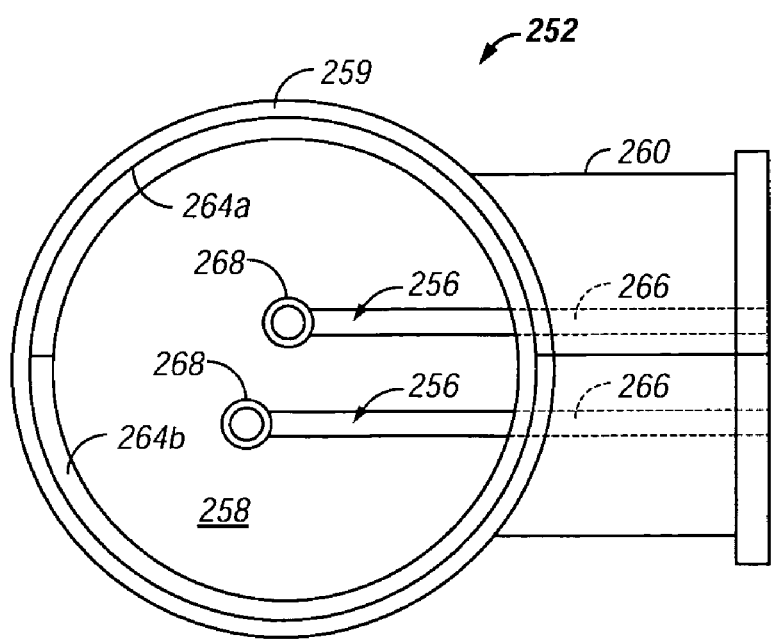
FIG. 4 illustrates an elevation view of a preferred coupling and connectors made in accordance with the present invention.

Referring now to FIGS. 3 and 4, the coupling 252 provides an access way from the chamber 258 to the air guns 102a–d. A preferred coupling 252 includes a neck 260 and a barrel portion 262. The neck 260 has an interior space 253 for receiving the connectors 256 and is adapted to house or mate with the air gun 102. Referring now to FIG. 4, the coupling 252 may be formed of mating shells 264a,b. Clamps 259 may be used to bind the shells 264a,b together. Such a split shell configuration facilitates field repair and maintenance by allowing quick and convenient access to the supply lines 104, equipment 106, and the air gun 102. The coupling 252 may be molded or formed by other known means. Alternatively, a flange (not shown) may be used in conjunction with thread fasteners or quick disconnect devices to hold the shells 264a,b together. Such fastening arrangements are known in the art and would apparent to one skilled in the art.

In other embodiments, the tubes may include one or more fluid tight compartments. These compartments may also include a buoyant fluid such as kerosene or air. These compartments may be selectively filled to achieve a desired buoyancy for the system 200.

Referring now to FIGS. 3 and 4, the connectors 256 provide a rugged connection between the supply lines 104 and the air guns 102. The supply lines 104b run generally axially within the tube chamber 258. The air gun connection interface 103d, however, is oriented generally perpendicular to the supply lines 104. To minimize the bending and need for sharp radii in the supply lines 104, the connector 256 has an axial portion 266 that mates with the air gun plug 103d and a angular portion 268 that mates with the supply lines 104. Thus, the connectors 256 enables, for example, electrical lines and air hoses, to establish electrical, data, and power connections to air guns 102a–d without bending.

Referring now to FIG. 3, the sleeves 234 provide a resilient and flexible connection between adjacent couplings 252 and with the lead hoses 240a,b. The sleeves 254 are a hose-like member that may be formed natural or synthetic rubbers or other materials suitable for marine environment. The sleeves 254 slide over the ends of the coupling barrel 262 to form a compressive fit between the sleeve 254 and the barrel 262 of the coupling 252. Additionally, a clamp 272 that surrounds the sleeve 254 and the coupling 252 can also be used.

To provide stability to the air guns 102a–d, a bridge 290 may be used to fasten the air gun tail 102b to an adjacent sleeve 254. The bridge 290 may be a clamp or two arms that support the air gun at the tail 102b. The bridge 290 need not be a rigid connection as, for example, used with rungs of a ladder. Rather, the bridge 290 may simply prop up the air gun 102, which is effectively cantilevered from the coupling 252. For example, the bridge 290 can allow limited movement along the A—A axis while substantially preventing the air gun 102 from rotating about the coupling 252.

Referring now to FIG. 2, the tow line 210, a termination 220, a harness 230, and lead hoses 240 of acoustic source system 200 make up the support structure for towing the preferred air gun cluster 100 and protective tubes 250a,b through the water. In an exemplary arrangement, the tow line 210 extends from a service vessel (not shown) or other vehicle (e.g., a paravane) and connects to the termination 220. The termination 220 acts as a tow point and can also provide a central conduit through which supply lines 104 and other equipment can be consolidated. The lead hoses 240a,b protect and guide the span of supply lines 104a,b that extend between the termination 220 and their respective tubes 250a,b.

Referring now to FIG. 3, the harness 230 provides the primary mechanical connection through which the air guns 102a–d are towed through the water. The harness 230 includes collars 232, links 234, and a mating end 236 that connects to the termination 220. Each of the collars 232 are fastened about the air guns 102a–d using known means such as threaded fasteners, clamps, rivets, or quick disconnect devices. The links 234 connect each of the collars 232, either directly or indirectly, to the mating end 236 that engages the termination 220. The links 234 may be formed of chains, cables, belts, rope, wire, and other similar lines. It should understood that while two sets of collars 232 and links 234 are shown, greater or fewer sets of the same may be used for different applications.

It should be noted that there are two mechanical connections between the air guns 102a–d and the termination 220. The first connection includes the couplings 252, sleeves 254, and the lead hose 250. The second connection is the harness 230. It will be appreciated that individual air guns can weigh several hundreds of pounds. Thus, the device used to tow the air guns will encounter significant stresses during use. It is therefore preferred that the harness 230 is configured such that it pulls the air guns 102a–d through the water without inducing traction in the first described connection. For example, the lead hoses 240 should be provided with sufficient slack such that the harness 230 transmits the towing force from the termination 220 to the air guns 102a–d.

Figure 5A:
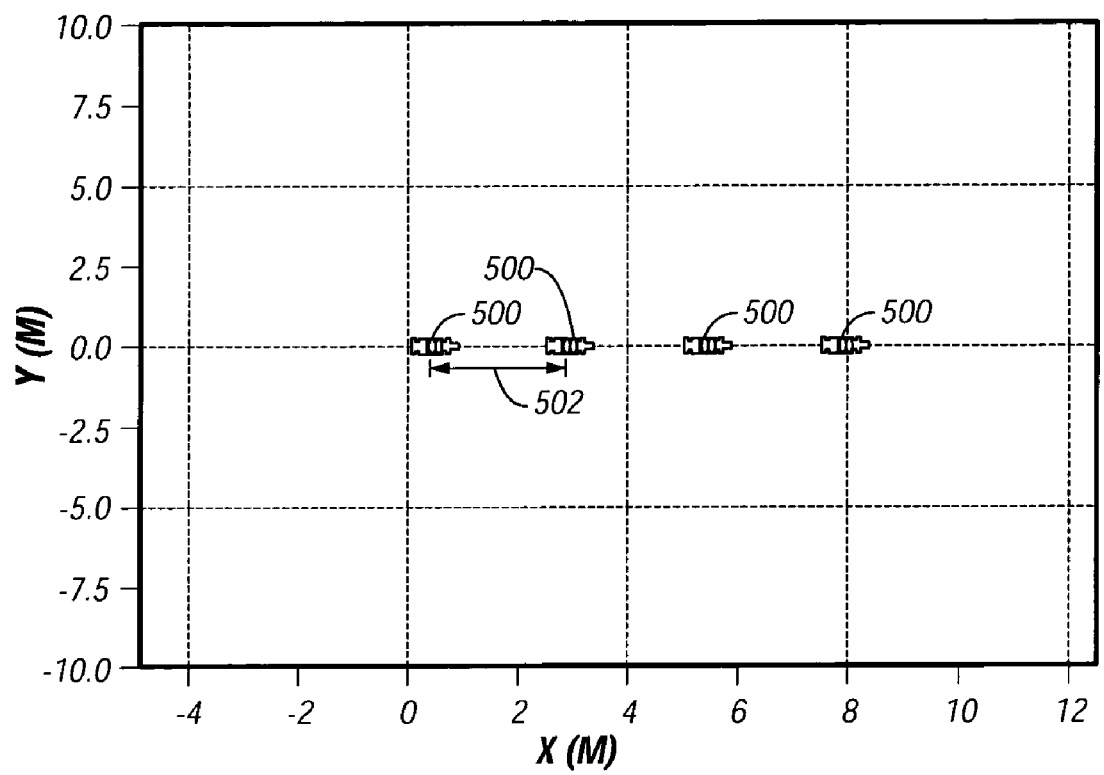
FIG. 5A graphically illustrates a relative spacing of a non-cluster type conventional acoustic source array.
Figure 5B:
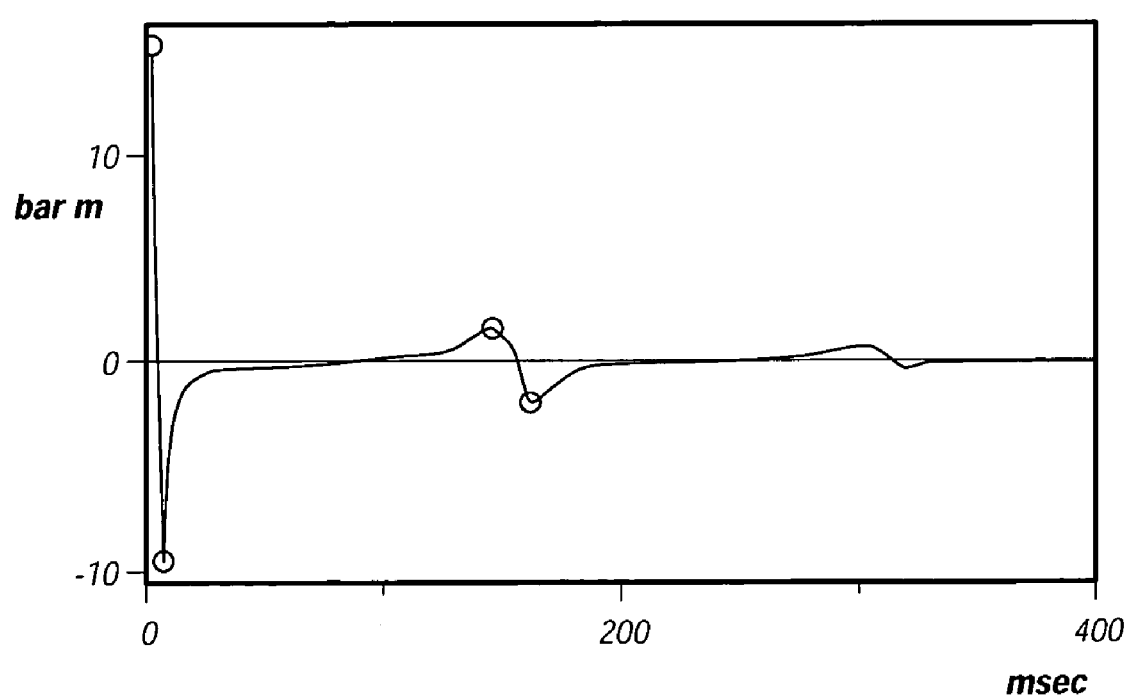
FIG. 5B graphically illustrates the calculated performance of the non-cluster type conventional acoustic source array.
Figure 5C:
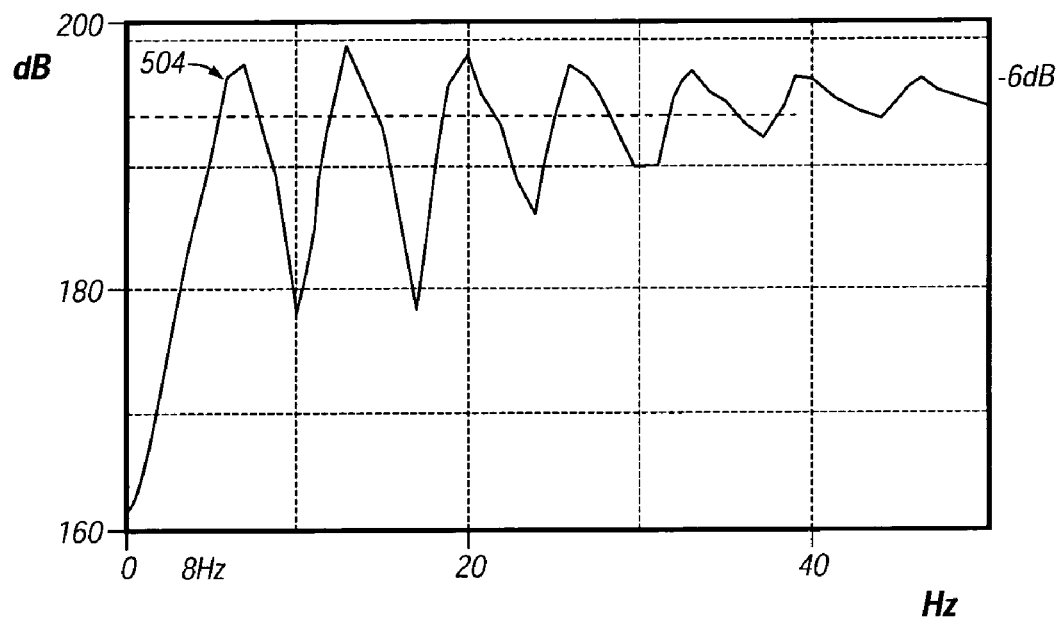
FIG. 5C graphically illustrates the available frequency range of the non-cluster type conventional acoustic source array.
Figure 5D:
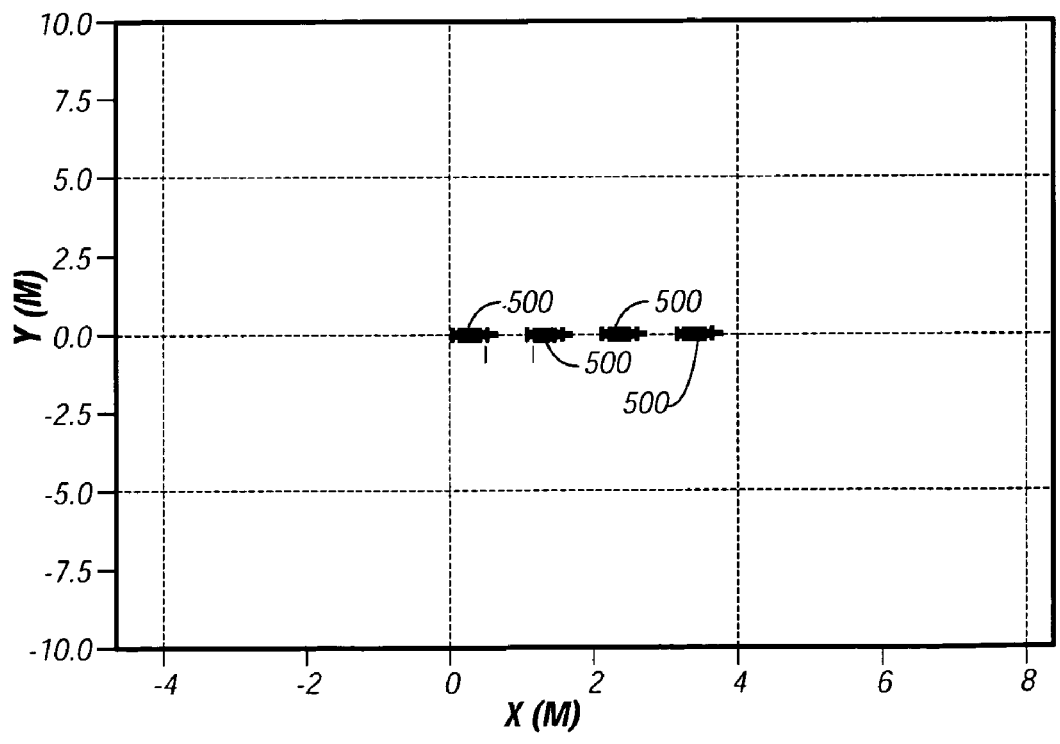
FIG. 5D graphically illustrates an exemplary spacing of a clustered acoustic source array that employs the teachings of the present invention.
Figure 5E:
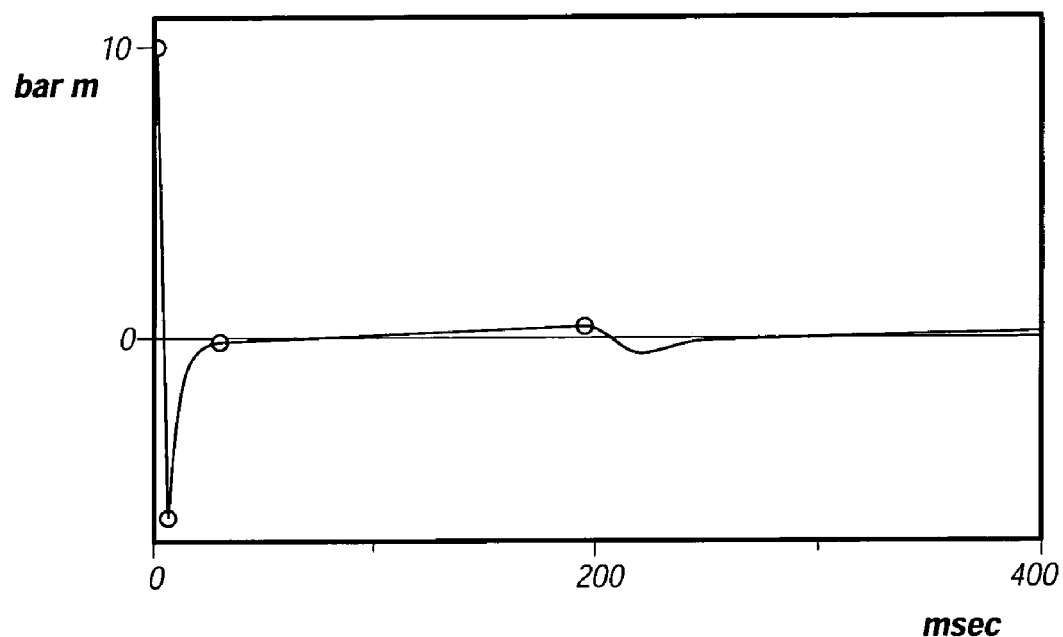
FIG. 5E graphically illustrates the calculated performance of a clustered acoustic source array that employs the teachings of the present invention.
Figure 5F:
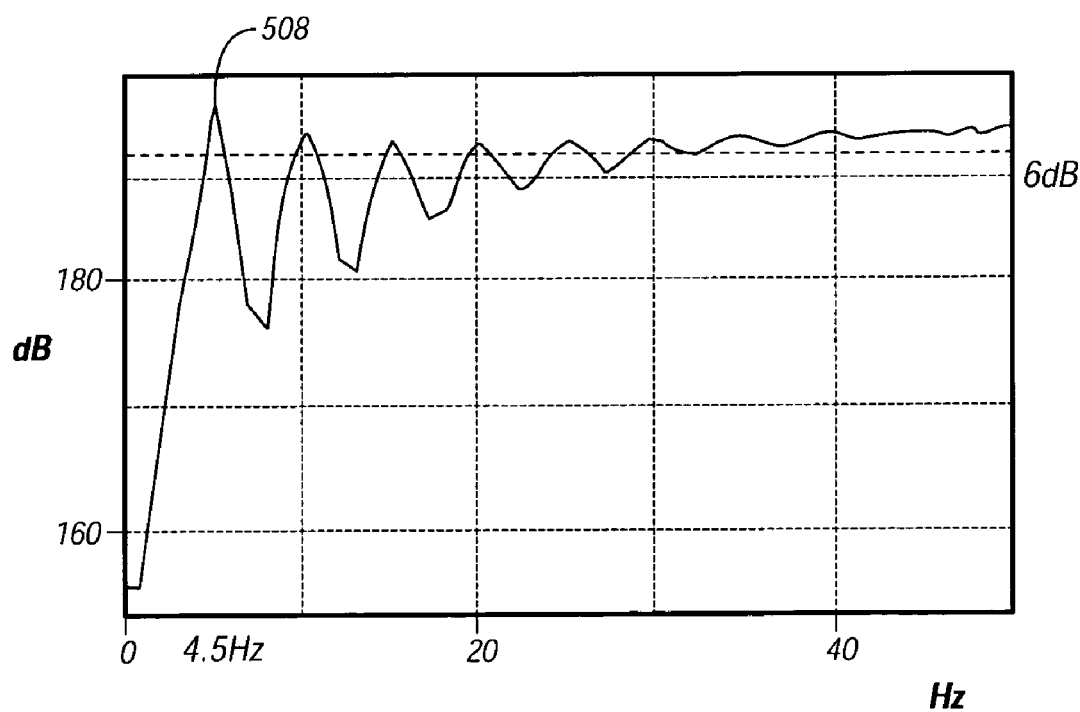
FIG. 5F graphically illustrates the available frequency range of a clustered acoustic source array that employs the teachings of the present invention.

Referring now to FIG. 5A–F, there are shown in graphical format the results of analyses using known computer modeling techniques. Referring initially to FIG. 5A, there is shown a conventional arrangement of four air guns 500 each having a 300 CC capacity. The port-to-port distance 502 between the air guns is about 2.4 meters. Referring briefly to FIG. 3, an exemplary port is identified with numeral 103c. Computer modeling indicates, as shown in FIG. 5B, that the peak bubble ratio (P/B) for this arrangement is about 7.7. As is known, P/B ratio provides an indication of the efficiency of an air gun array. Moreover, as shown in FIG. 5C, the low-end frequency 504 is about 8 HZ. Applying the teachings of the present invention as shown in FIG. 5D, the same air guns 500 are arranged such that the port-to-port distance 506 between the air guns is about 1 meter. It should be understood that the air gun arrangement shown in FIG. 5D is merely a generic software rendered picture that shows relative spacing between the air guns and other aspects of air gun orientation. Referring now to FIGS. 5E,F, it is predicted that the P/B ratio increases to 31.5 and the available low-end frequency 508 is extended to 4.5 HZ. Thus, by using a clustering arrangement in accordance with the present invention, at least (1) the efficiency of the air gun array is significantly enhanced; and (2) the available frequency is extended.

Referring now to FIG. 6 there is shown an exemplary marine seismic survey system 600 deployed in conjunction with a service vessel 602. The survey system 600 is connected to the service vessel 602 via a tow line 604. The tow line 604 can include towing cables, supply lines and other lines enabling the transfer of data, power and hydraulic fluids (e.g., air) between the service vessel 602 and the survey system 600. The service vessel 602 can also include processors 606 in communication with the survey system 600. The processors 606 can be configured to execute known tasks such as control system operations and record data. The survey system 600 includes a acoustic source array 610. The array 610 is further made up of sub arrays 620. Each sub array 620 includes one or more acoustic source systems 200, each of which have air gun clusters 100. The array 610 presents a minimal profile with respect to the direction of towing. This minimal profile can, for example, reduce fuel consumption by the service vessel while allowing increased towing speed. It should be understood that FIG. 6 illustrates an exemplary survey system arrangement. Other arrangements can include greater or few arrays, sub arrays, or air gun clusters. Moreover, several rows of arrays may be simultaneously deployed by the service vessel.

Presuming familiarity with the above-described features, the following discussion regarding the operation of the preferred acoustic source system dispenses with the numerals associated with these features. During an exemplary marine seismic survey campaign, the acoustic source system is deployed by a service vessel in the waters of a geographical area of interest. The source system is towed beneath the water behind the vessel via a tow line leading from the ship to the termination. Similarly, supply lines for transmitting hydraulic fluid, electrical power, air and data extend from the vessel to the source system. The acoustic source system can include an air gun array having one or more subarrays. Each subarray can further include an air gun cluster. The air gun array is suspended from a suitable floatation buoy at a predetermined depth.

During towing, the harness, which is connected to the termination, pulls the air gun cluster through the water. Because the harness takes up the traction forces induced during towing, the supply lines are not subject to such tension forces. Additionally, the protective tubes further protect the supply lines by limiting the damage that occurs as hoses or wires are dragged through the water. Upon activation, the air guns of a cluster each release individual air bubbles into the water. Because the air guns are in close proximity to one another, the individual air bubbles coalesce into a single bubble that produces the desired acoustical signal. Furthermore, because the auxiliary equipment is outboard of the air guns, this equipment is not directly exposed to the shock associated with the air gun operation.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

The invention claimed is:

1. A towable marine acoustic source apparatus, comprising:
   an array including at least a first cluster, said first cluster including at least two acoustic sources each having a longitudinal axis, said first cluster being defined by a spatial relationship wherein:
   (a) said acoustic sources are disposed at a substantially common depth, (b) each said longitudinal axis of said sources are substantially orthogonal to a pre-determined direction of towing; and (c) each said longitudinal axis of said sources are substantially orthogonal to a horizontal plane.

2. The apparatus of claim 1 wherein said first cluster comprises at least two air guns.

3. The apparatus of claim 2 wherein said airguns each have a connection interface adapted for receiving one of gas, electrical power, said connection interfaces being oriented in substantially the same direction.

4. The apparatus of claim 2 wherein said air guns each have a pre-defined center, said air guns having a center-to-center spacing is no greater than about $D_s$, where $D_s$ is calculated by the equation: $D_s=0.62 \cdot V^{1/3}$ meters, where V is a volume of a largest operative acoustic source in cubic inches.

5. The apparatus of claim 2 wherein said air guns each have a pre-defined center, said air guns having a center-to-center spacing that is no less than $(D_c-(D_c)(50\%))$, where $D_c$ is calculated by the equation:

$$D_c = 2\left(\frac{3}{4\pi}\frac{P}{P_o}V\right)^{1/3},$$

where P is an acoustical source absolute pressure, Po is an ambient absolute pressure, and V is a volume of said acoustical source in said cluster.

6. A method of performing a marine seismic survey, comprising:

(a) towing a plurality of acoustic sources each having a longitudinal axis; and (b) providing an array having at least a first cluster, the first cluster being formed by:
 (i) positioning the acoustic sources along a plane generally parallel with a water surface; and
 (ii) aligning the longitudinal axis of each acoustic source substantially orthogonal to a pre-determined direction of towing; and
 (iii) aligning the longitudinal axis of each acoustic source substantially orthogonal to the water surface.

7. The method of claim 6 wherein the air guns each have a pre-defined center, the air guns having a center-to-center spacing is no greater than about $D_s$ where $D_s$ is calculated by the equation: $D_s=0.62 \cdot v^{1/3}$ meters, where V is a volume of a largest operative acoustic source in cubic inches.

8. The method of claim 6 further comprising:

defining a center for each air gun; and maintaining a center-to-center spacing no less than $(D_c=(D_c)(50\%))$, where $D_c$ is calculated by the equation:

$$D_c = 2\left(\frac{3}{4\pi}\frac{P}{P_o}V\right)^{1/3},$$

where P is an acoustical source absolute pressure, Po is an ambient absolute pressure, and V is a volume of the air gun in the cluster.

9. The method of claim 6 further comprising forming a second cluster of at least two air guns each having ports; positioning the second cluster adjacent the first cluster; and aligning the ports of the second cluster air guns along a second plane that is substantially parallel with the first plane.

10. A marine acoustic source system, comprising:

(a) an acoustic array including at least one cluster, said cluster having at least two acoustic sources, said sources each having a longitudinal axis, said cluster being defined by a spatial relationship wherein:
 (i) said acoustic sources are aligned in a plane generally parallel with the water surface;
 (ii) each said longitudinal axis of said sources are substantially orthogonal to a pre-determined direction of towing;
 (iii) each said longitudinal axis of said sources are substantially orthogonal to the water surface;

(b) a supply line operatively connected to said acoustic array, said supply line adapted to convey one of power and data to said acoustic array;

(c) a termination matable with said supply line;

(d) a tow line connected to said termination for towing said array through water; and (e) a service vessel to which said tow line is attached.

* * * * *